United States Patent
Schrade et al.

(10) Patent No.: US 12,469,001 B2
(45) Date of Patent: *Nov. 11, 2025

(54) SYSTEM AND METHOD FOR DETERMINATION OF EXPORT CODES

(71) Applicant: Walmart Apollo, LLC, Bentonville, AR (US)

(72) Inventors: Alyssa J. Schrade, Cave Springs, AR (US); Stewart D. Lewis, Centerton, AR (US); Jevon T. Jamieson, Rogers, AR (US); Ahalya Vikram, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/919,640

(22) Filed: Oct. 18, 2024

(65) Prior Publication Data
US 2025/0045682 A1    Feb. 6, 2025

Related U.S. Application Data

(63) Continuation of application No. 18/085,737, filed on Dec. 21, 2022, now Pat. No. 12,141,736, which is a
(Continued)

(51) Int. Cl.
*G06Q 10/0831*    (2023.01)
*G06N 20/00*    (2019.01)
(Continued)

(52) U.S. Cl.
CPC ......... *G06Q 10/0831* (2013.01); *G06N 20/00* (2019.01); *G06Q 10/0838* (2013.01); *G06F 16/951* (2019.01)

(58) Field of Classification Search
CPC .............. G06Q 10/08; G06Q 10/0831; G06Q 10/0838; G06F 16/951
See application file for complete search history.

(56) References Cited

U.S. PATENT DOCUMENTS

| 6,092,059 A | 7/2000 | Straforini |
| 6,751,600 B1 | 6/2004 | Wolin |

(Continued)

FOREIGN PATENT DOCUMENTS

| CN | 103699523 B | 6/2016 |

OTHER PUBLICATIONS

Ding, Liya, ZhenZhen Fan, and DongLiang Chen. "Auto-categorization of HS code using background net approach." Procedia Computer Science 60 (2015): 1462-1471. (Year: 2015).*

(Continued)

*Primary Examiner* — Scott M Tungate
(74) *Attorney, Agent, or Firm* — Fitch, Even, Tabin & Flannery LLP (57) ABSTRACT

The export of products from a jurisdiction is enabled by choosing export codes from a model. The electronic model comprises a branched tree defining a configuration of the export codes and selection criteria for the codes. The branched tree includes a plurality of branches and leaves. Each of the leaves includes an export code for a product, a probability that the export code for the product is accurate, and a description of the product. The tree is traversed to obtain the codes. The tree is trained to improve the quality of the selection process.

20 Claims, 8 Drawing Sheets

Related U.S. Application Data continuation of application No. 17/698,087, filed on Mar. 18, 2022, now abandoned, which is a continuation of application No. 16/539,608, filed on Aug. 13, 2019.

(60) Provisional application No. 62/719,845, filed on Aug. 20, 2018.

(51) Int. Cl.
  *G06Q 10/083* (2023.01)
  *G06F 16/951* (2019.01)

(56) References Cited

U.S. PATENT DOCUMENTS

| | | | |
|---|---|---|---|
| 7,870,039 B1 | 1/2011 | Dom | |
| 9,436,919 B2 | 9/2016 | Sun | |
| 12,141,736 B2 | 11/2024 | Schrade | |
| 2005/0004894 A1* | 1/2005 | Uy | G06Q 10/083 |
| 2012/0123921 A1* | 5/2012 | Black | G06Q 30/0283 705/331 |
| 2012/0130927 A1* | 5/2012 | Shimogori | G06N 20/00 706/12 |
| 2017/0046656 A1* | 2/2017 | Bramble | G06F 16/9535 |
| 2020/0057987 A1 | 2/2020 | Schrade | |
| 2022/0207471 A1 | 6/2022 | Schrade | |
| 2023/0128851 A1 | 4/2023 | Schrade | |

OTHER PUBLICATIONS

B. Turhan, G. B. Akar, C. Turhan and C. Yukse, "Visual and Textual Feature Fusion for Automatic Customs Tariff Classification," 2015 IEEE International Conference on Information Reuse and Integration, 2015, pp. 76-81, doi: 10.1109/IRI.2015.22. (Year: 2015).
Bhalotia, Ankush; "Implementing a Machine-Learning Based eCommerce Product Classification System"; https://blog.dataweave.com/implementing-a-machine-learning-based-ecommerce-product-classification-system-f846d894148b; Jun. 22, 2017; pp. 1-8.
Cax Mohan S; "A case study: Automated Product Catalog Classification to optimize search & discovery"; https://crowdanalytix.com/blog/a-case-study--automated-product-catalog-classification-to-optimize-search---discovery; Jun. 29, 2016; pp. 1-5.
Ristoski, Petar et al.; "A Machine Learning Approach for Product Matching and Categorization"; http://www.semantic-web-journal.net/system/files/swj1470.pdf; 2016; pp. 1-17.
U.S. Appl. No. 16/539,608; Notice of Allowance and Fees Due (PTOL-85) mailed Dec. 22, 2021; (pp. 1-18).
U.S. Appl. No. 17/698,087; Notice of Allowance and Fees Due (PTOL-85) mailed Sep. 30, 2022; (pp. 1-13).
U.S. Appl. No. 18/085,737; Final Rejection mailed Sep. 11, 2023; (pp. 1-14).
U.S. Appl. No. 18/085,737; Non-Final Rejection mailed Apr. 22, 2024; (pp. 1-14).
U.S. Appl. No. 18/085,737; Non-Final Rejection mailed May 30, 2023; (pp. 1-11).
U.S. Appl. No. 18/085,737; Notice of Allowance and Fees Due (PTOL-85) mailed Jul. 25, 2024; (pp. 1-17).

* cited by examiner

SYSTEM AND METHOD FOR DETERMINATION OF EXPORT CODES

CROSS-REFERENCE TO RELATED APPLICATION(S)

This application is a continuation of U.S. patent application Ser. No. 18/085,737, filed Dec. 21, 2022, which is a continuation of U.S. patent application Ser. No. 17/698,087, filed Mar. 18, 2022, which is a continuation of U.S. patent application Ser. No. 16/539,608, filed Aug. 13, 2019, which claims the benefit of the following U.S. Provisional Application No. 62/719,845, filed Aug. 20, 2018, all of which are incorporated herein by reference in their entireties.

TECHNICAL FIELD

These teachings relate to export codes or information and, more specifically, to the determination of this information.

BACKGROUND

Products are shipped across the world from and between different locations and jurisdictions. When leaving a country, for example, the United States, an export code needs to be obtained. The export code is associated with a particular product and typically is associated with details concerning that product. For example, an export code may be associated with men's cotton t-shirts. Other examples of export codes are possible.

In the United States, the Harmonized Tariff Schedule (also known as Schedule B) is the primary source of determining the tariff (custom duties) for goods exported from the United States to foreign countries. The Harmonized Tariff Schedule classifies a good or product based upon its name, use and/or material used in its construction and assigns it a ten-digit classification code number. There are over 9,000 classification code numbers.

Export codes can be used for various purposes. In one particular example, the export codes are used to track the nature and amount of products leaving a jurisdiction.

BRIEF DESCRIPTION OF DRAWINGS

The above needs are at least partially met through the provision of approaches that determine action to take upon a product recall, wherein.

DETAILED DESCRIPTION

Generally speaking, in the present approaches, an electronic model defines a configuration of export codes and rules to choose these codes. In aspects, the model is a tree-like data structure and when the model is traversed according to product information for a product, the export code is determined for the product. The model is periodically fine-tuned and improved to include or incorporate web-scraped information and information from other sources. When a new product is to be exported and needs a code, product images and other information are obtained for the product and the images are applied to the model to obtain the export code. Once the code is obtained, the product can be exported on a delivery vehicle and this information can also be provided to a government authority that monitors exports.

In the approaches described here, the model learns from various types of data, e.g., previously classified items, Harmonized Tariff Schedule (HTS) codes, product descriptions, product images, and web-scraped information to mention a few examples. The model is continuously (or periodically) refined and updated. The model can then be used to determine one of the unique HTS codes using, for example, the images and product description given by suppliers of the product (or others).

In these regards, information can be obtained from item information databases, online catalogs, and the internet to mention a few examples. Each product or good typically requires a certain type of information to classify (and obtain an export code). For example, shoes may need the length of the ankle, material of the upper part of the shoe, and the material of the lower part of the shoe. Food products may require the ingredients found in the products. When this information is not available from some sources (e.g., from the supplier or manufacturer), it may be obtained from other sources (e.g., by web-scraping information from websites on the internet).

After gathering the item description data (from whatever source), a pre-process can be utilized to clean the information to determine, for example, the name, use, and material used to determine the code. Cleaning may include obtaining only the required data for a given product or commodity, removing information such as brand name and product title, correcting spelling errors, understanding abbreviations, or splitting words that have become erroneously attached to each other.

Not all of the 9000+ HTS codes have examples that have been classified. Consequently, the model is trained to include new HTS codes that are synthesized. Historical or other information can be used to train the model. In other examples, images obtained from on-line catalog are used to train the last layers of a pretrained model in a process known as transfer learning to detect the edges and shapes in the images.

Using the model, items can be classified using both text (describing the product or item) and images (taken of the product or item). The output of this process is an export code, for example, an HTS code.

In many of these embodiments, a system for enabling the export of products from a jurisdiction includes an electronic communication network, an electronic database, an electronic model, a control circuit, a shipping vehicle, one or more products-to-be-shipped, an electronic user device, and one or more electronic sensors.

The electronic database stores a product information table of currently classified products. Each entry of the table includes a product number and at least one attribute of a currently classified product.

The electronic model is stored in the database and comprises a branched tree defining a configuration of export codes and selection criteria for the codes. The branched tree includes a plurality of branches and leaves, and each of the leaves includes an export code for a product, a probability that the export code for the product is accurate, and a description of the product.

The control circuit is coupled to the electronic communication network and the database. The control circuit is configured to, via the electronic communication network, web-scrape external websites for product information concerning products presently represented in the model and similar products not presently represented in the model. The control circuit is further configured to create synthetic export codes for selected products not presently represented in the model according to machine learning approaches using the web-scraped information and export codes obtained from a regulatory source of a jurisdiction. The control circuit is additionally configured to adjust the model based at least in part upon one or more of the classified product information from the database, the web-scraped product information, and the synthetic export codes.

The one or more products-to-be-shipped outside the jurisdiction are shipped using the shipping vehicle. The products requiring export code assignment before the vehicle leaves the jurisdiction. The electronic user device coupled to the network.

The one or more electronic sensors are coupled to the electronic user device. The sensors are configured to obtain an image of one of the products to-be-shipped. The electronic user device, upon user action, forms a request to export the products, the request including the image.

The control circuit is further configured to receive the request. The control circuit is configured to, based upon an analysis of the image, traverse the branched tree of the model to obtain one or more potential export codes for the products-to-be-shipped. The potential export codes are situated at one or more leaves of the tree and each of the potential export codes having an associated probability. When the associated probability associated with one of the potential export codes is greater than a predetermined threshold, the one potential export code is selected. When probability of all the potential export codes is less than a threshold, then one of the potential export codes is selected based upon a predetermined criteria.

The selected export code is transmitted to an electronic processing device of the regulatory source via the electronic communication network. The shipping vehicle responsively exits the jurisdiction with the products only after the selected export code is determined.

In aspects, the request includes additional product information obtained from a user at the electronic user device via a user interface at the electronic device. In other aspects, the adjustment is made periodically at regular intervals.

In other examples, the sensors include cameras. In still other examples, the jurisdiction is a country.

In other aspects, the delivery vehicle is a truck, train, ship, automated ground vehicle, or aerial drone. Other examples are possible.

In other examples, the control circuit and database are disposed at a central processing center. In yet other examples, the predetermined criteria is automatically determined based upon historical data. In some examples, the predetermined criteria is determined by a human operator.

In others of these embodiments, the export of products from a jurisdiction is enabled. An electronic communication network is provided. An electronic database that stores a product information table of currently classified products is also provided. Each entry of the table includes a product number and at least one attribute of a currently classified product.

An electronic model is stored in the database and the electronic model comprises a branched tree defining a configuration of export codes and selection criteria for the codes. The branched tree includes a plurality of branches and leaves. Each of the leaves includes an export code for a product, a probability that the export code for the product is accurate, and a description of the product.

At a control circuit and via an electronic communication network, external websites are web-scraped for product information concerning products presently represented in the model and similar products not presently represented in the model. At the control circuit, synthetic export codes are created for selected products not presently represented in the model according to machine learning approaches using the web-scraped information and export codes obtained from a regulatory source of a jurisdiction.

At the control circuit, the model is adjusted based at least in part upon one or more of the classified product information from the database, the web-scraped product information, and the synthetic export codes. A shipping vehicle and one or more products-to-be-shipped outside the jurisdiction are provided. The products-to-be-shipped use the shipping vehicle and the products requiring export code assignment before the vehicle leaves the jurisdiction.

An electronic user device is coupled to the network. One or more electronic sensors are coupled to the electronic user device, and the sensors are configured to obtain an image of one of the products to-be-shipped. The electronic user device, upon user action, forms a request to export the products, and the request includes the image.

The request at the control circuit. Based upon an analysis of the image, the branched tree of the model is traversed to obtain one or more potential export codes for the products-to-be-shipped. The potential export codes are situated at one or more leaves of the tree and each of the potential export codes has an associated probability.

At the control circuit and when the associated probability associated with one of the potential export codes is greater than a predetermined threshold, the one potential export code is selected. At the control circuit and when probability of all the potential export codes is less than a threshold, then one of the potential export codes is selected based upon a predetermined criteria.

At the control circuit, the selected export code is transmitted to an electronic processing device of the regulatory source via the electronic communication network. The shipping vehicle responsively exits the jurisdiction with the products only after the selected export code is determined.

Figure 1:
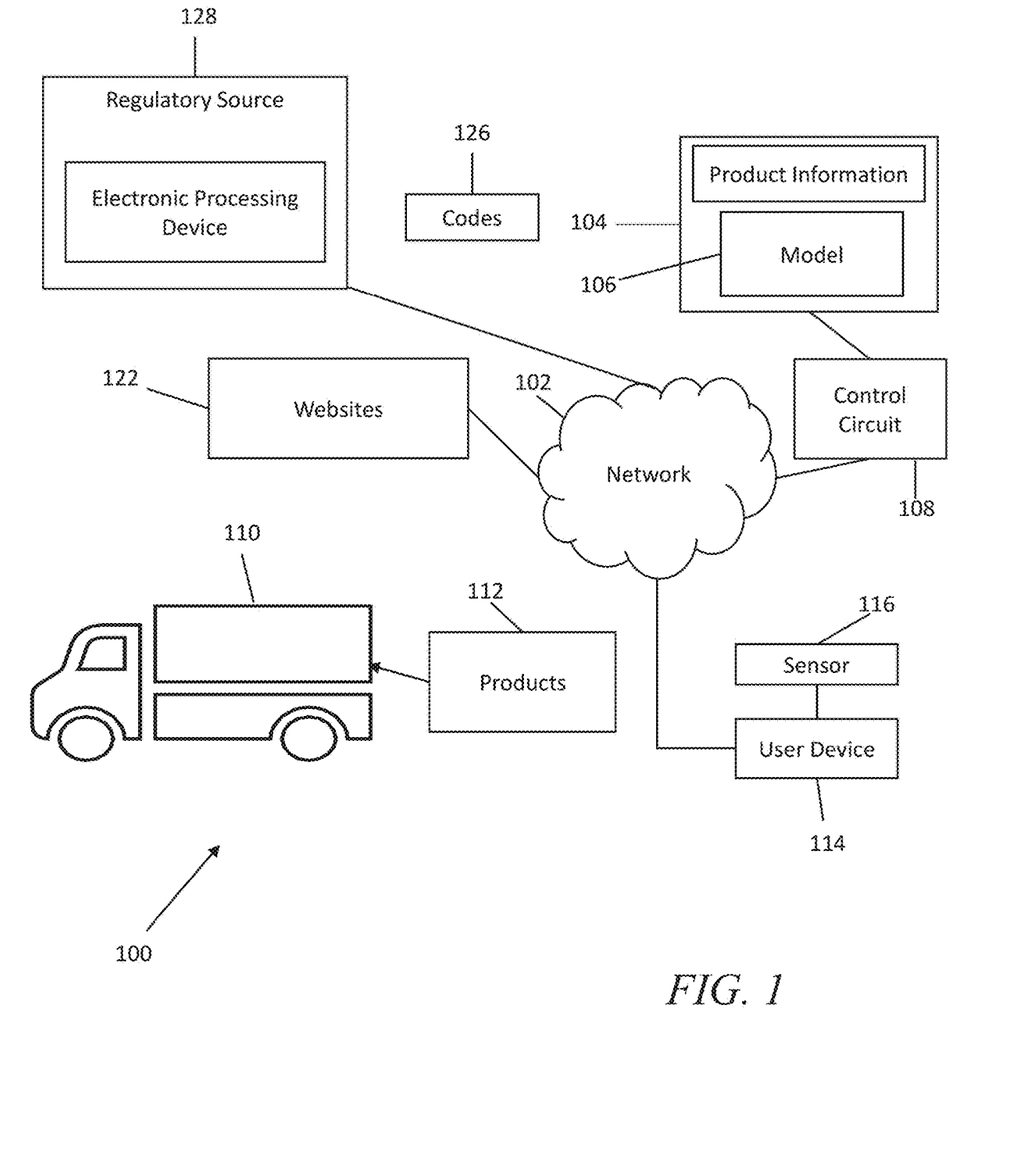
FIG. 1 comprises a diagram of a system as configured in accordance with various embodiments of these teachings.

Referring now to FIG. 1, a system 100 for enabling the export of products from a jurisdiction is described. The approaches described herein result in obtaining export codes, which may include letters, numbers, and/or special characters. However, it will be appreciated that these approaches may be utilized to determine other types of classification information and that the codes and/or information need not be strictly related to the export of products or goods. The system 100 includes an electronic communication network 102, an electronic database 104, an electronic model 106, a control circuit 108, a shipping vehicle 110, one or more products-to-be-shipped 112, an electronic user device 114, and one or more electronic sensors 116.

The electronic communication network 102 is any type of communication network or combination of networks such as the internet, cellular communication networks, data networks, wide area networks, local area networks, wireless networks, or any other type of electronic communication network.

The electronic database 104 is any type of electronic memory storage device. The electronic database 104 stores a product information table of currently classified products. Each entry of the table includes a product number and at least one attribute of a currently classified product.

The electronic model 106 is stored in the database and the electronic model comprises a branched tree defining a configuration of export codes and selection criteria for the codes. The branched tree includes a plurality of branches and leaves. Each of the leaves includes an export code for a product, a probability that the export code for the product is accurate, and a description of the product.

The control circuit 108 is coupled to the electronic communication network 102 and the database 104. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 108 may be configured (for example, by using corresponding programming stored in a memory as will be well understood by those skilled in the art) to carry out one or more of the steps, actions, and/or functions described herein. In other examples, the control circuit and database are disposed at a central processing center.

The shipping vehicle 110 is a truck, train, ship, automated ground vehicle, or aerial drone. Other examples are possible.

The products-to-be-shipped 112 outside the jurisdiction are shipped using the shipping vehicle. The products requiring export code assignment before the vehicle 110 leaves the jurisdiction. In still other examples, the jurisdiction is a country.

The electronic user device 114 is any type of electronic device such as a personal computer, cellular phone, smartphone, laptop, or tablet to mention a few examples. The device 114 includes a user interface and is coupled to the network 102.

The electronic sensors 116. In other examples, the sensors include cameras. Other examples are possible. The electronic sensors 116 are coupled to the electronic user device 114.

The control circuit 108 is configured to, via the electronic communication network 102, web-scrape external websites 122 for product information concerning products presently represented in the model and similar products not presently represented in the model. The control circuit 108 is further configured to create synthetic export codes for selected products not presently represented in the model according to machine learning approaches using the web-scraped information and export codes 126 obtained from a regulatory source 128 of a jurisdiction. The control circuit 108 is additionally configured to adjust the model based at least in part upon one or more of the classified product information 124 from the database, the web-scraped product information, and the synthetic export codes.

The sensors 116 are configured to obtain an image of one of the products to-be-shipped. The electronic user device 114, upon user action, forms a request to export the products, and the request includes the image.

The control circuit 108 is further configured to receive the request. The control circuit 108 is configured to, based upon an analysis of the image, traverse the branched tree of the model to obtain one or more potential export codes for the products-to-be-shipped 112. The potential export codes are situated at one or more leaves of the tree and each of the potential export codes having an associated probability. When the associated probability associated with one of the potential export codes is greater than a predetermined threshold, the one potential export code is selected. When probability of all the potential export codes is less than a threshold, then one of the potential export codes is selected based upon a predetermined criteria. In some examples, the predetermined criteria is automatically determined based upon historical data. In other examples, the predetermined criteria is determined by a human operator.

The selected export code is transmitted to an electronic processing device 120 of the regulatory source via the electronic communication network. The shipping vehicle 110 responsively exits the jurisdiction with the products 112 only after the selected export code is determined.

In aspects, the request includes additional product information obtained from a user at the electronic user device via a user interface at the electronic device 114. In other aspects, the adjustment is made periodically at regular intervals.

Figure 2:
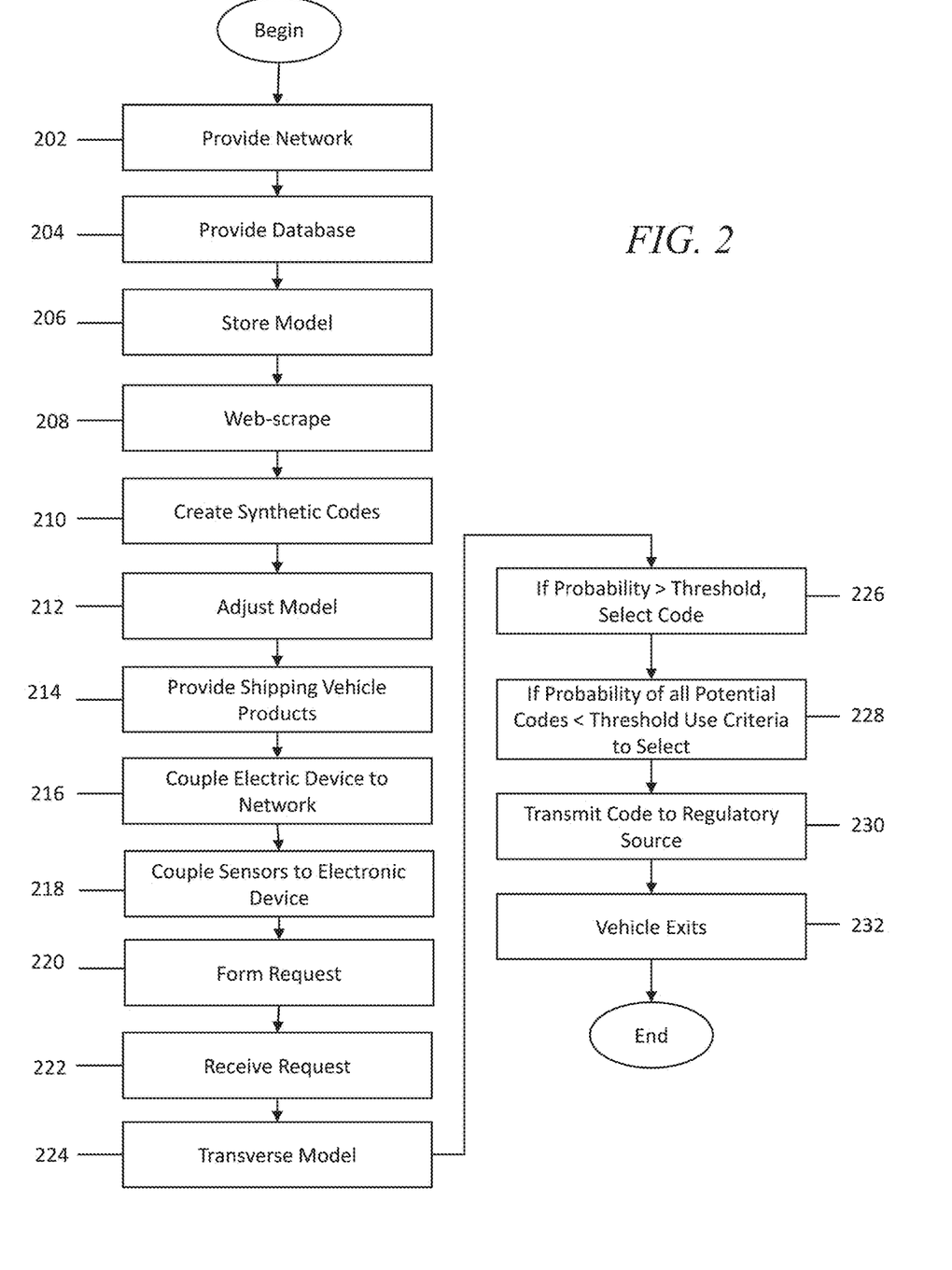
FIG. 2 comprises a flowchart as configured in accordance with various embodiments of these teachings.

Referring now to FIG. 2, an approach for determining the export code of products to be exported from a jurisdiction is described. At step 202, an electronic communication network is provided. The electronic communication network is any type of communication network or combination of networks such as the internet, cellular communication networks, data networks, wide area networks, local area networks, wireless networks, or any other type of electronic communication network.

At step 204, an electronic database that stores a product information table of currently classified products is also provided. Each entry of the table includes a product number and at least one attribute of a currently classified product. Alternatively, other types of data structures can be used.

At step 206, an electronic model is stored in the database and the electronic model comprises a branched tree defining a configuration of export codes and selection criteria for the codes. The branched tree includes a plurality of branches and leaves. Each of the leaves includes an export code for a product, a probability that the export code for the product is accurate, and a description of the product. The use of the tree data structure allows for the quick and efficient retrieval of information and is advantageous compared to other types of data structures that are slower and less efficient to traverse. Consequently, an underlying control circuit or computer implementing these approaches itself operates more quickly and efficiently.

At step 208, a control circuit (via an electronic communication network) is used to web-scrape external websites for product information concerning products presently represented in the model and similar products not presently represented in the model. In aspects, a web page is web-scraped by fetching the web-page and extracting information from the web page. Fetching may involve downloading of a page from a server or other arrangement. Once fetched, data or information can be extracted from the web page. In these regards, the web page may be parsed, searched, reformatted, or portions copied and stored.

At step 210 and at the control circuit, synthetic export codes are created for selected products not presently represented in the model according to machine learning approaches using the web-scraped information and export codes obtained from a regulatory source of a jurisdiction. In one aspect, the codes are generated based upon an analysis of existing codes. Existing and known codes (obtained from a database) are analyzed and compared to web-scraped (or other types of) information. Then, a determination can be made as to whether to add a new code to the tree, modify a code in the tree, or delete a code from the tree. For instance, a code may be located on a government list for woman cotton t-shirts and a determination made if this classification matches, is confirmed by, or is not contradicted by web-scraped information. Once confirmed and if this code is not on the tree, it may be added at an appropriate location in the tree data structure of the model. Historical information may be maintained concerning the accuracy of this code and this historical information also included with the code on the tree.

At step 212 and at the control circuit, the model is adjusted based at least in part upon one or more of the classified product information from the database, the web-scraped product information, and the synthetic export codes. As mentioned, this may involve modifications to leaves of the tree. However, the structure of the branches of the tree may also be modified (e.g., branches and relationships in the tree may be modified).

At step 214, a shipping vehicle and one or more products-to-be-shipped outside the jurisdiction are provided. The products-to-be-shipped use the shipping vehicle and the products requiring export code assignment before the vehicle leaves the jurisdiction.

At step 216, an electronic user device is coupled to the network. The electronic user device may be a personal computer, cellular phone, smartphone, laptop, or tablet to mention a few examples.

At step 218, one or more electronic sensors are coupled to the electronic user device, and the sensors are configured to obtain an image of one of the products to-be-shipped. In examples, the sensors may be cameras. Other examples of sensors are possible.

At step 220, the electronic user device, upon user action, forms a request to export the products, and the request includes the image. For example, a camera on a smart phone takes a photo of a product. A user may send an electronic request via email that includes the photo and potentially other information to the control circuit.

At step 222, the request is received at the control circuit. The control circuit analyzes the image, for example, using image recognition software that determines dimensions, materials, shapes, colors, sizes, or other aspects of the product depicted in the image.

At step 224 and based upon an analysis of the image, the branched tree of the model is traversed to obtain one or more potential export codes for the products-to-be-shipped. The potential export codes are situated at one or more leaves of the tree and each of the potential export codes has an associated probability. For example, analysis may indicate that image is of apparel, which branches into pants, shirts, socks, or other, each of which may branch into men's woman's and children, and these further branch into fabric types (e.g., cotton, polyester), and then finally into leaves which include codes and probabilities. Again, the end result of a traversal of a tree is to arrive at one or more leaves. It will be appreciated that only one leaf may be determined, but in some instances more than one leaf may be the end result. For example, for some items of apparel that is 50% cotton and 50% polyester, two leaves may be obtained (one for each material and each having a code) each having an associated code and probability for that code being correct.

At step 226 and at the control circuit, when the associated probability associated with one of the potential export codes is greater than a predetermined threshold, the one potential export code is selected. The threshold may be selected by a user or by an administrator to mention two examples.

At step 228 and at the control circuit, when probability of all the potential export codes is less than a threshold, then one of the potential export codes is selected based upon a predetermined criteria. For example, the predetermined criteria may be an identification of the code with the highest probability.

At step 230 and at the control circuit, the selected export code is transmitted to an electronic processing device of the regulatory source via the electronic communication network. The electronic processing device may be a computer or electronic server to mention two examples.

At step 232, the shipping vehicle responsively exits the jurisdiction with the products only after the selected export code is determined. For example, products may be loaded on the vehicle and the vehicle only allowed to leave the shipping center or warehouse once a code is obtained. In another example, the vehicle may be proceeding to an exit point of the jurisdiction (e.g., a port or border crossing) and the vehicle only allowed to unload or cross the border when the code has been obtained.

Figure 3:
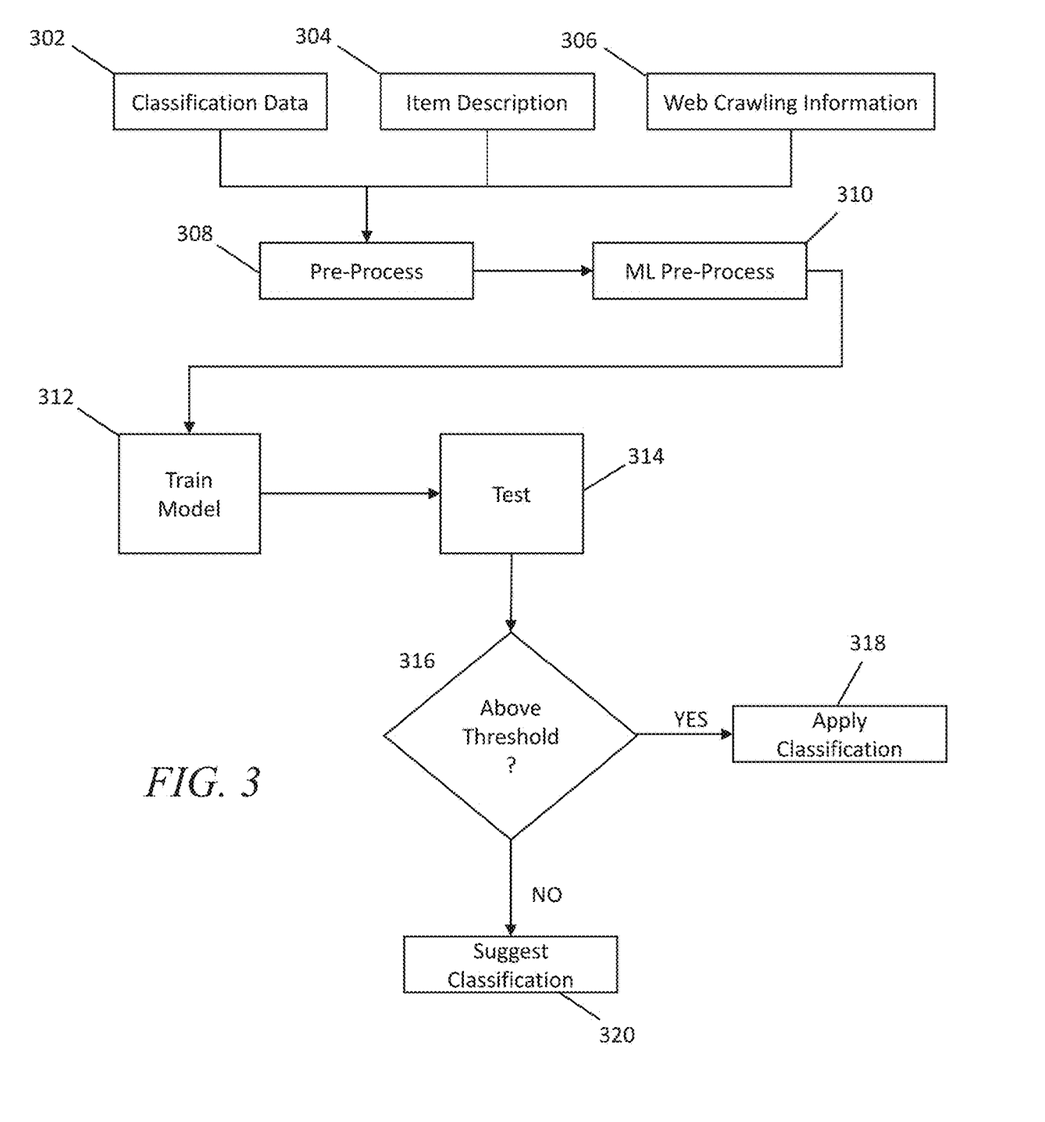
FIG. 3 comprises a flowchart as configured in accordance with various embodiments of these teachings.

Referring now to FIG. 3, another example of an approach for determining the export code of products to be exported from a jurisdiction is described.

At step 308, classification data 302, item description data 304, and web-crawling information is pre-processed. The classification data 302 may include known classification codes, item descriptions, and department categories. In examples, the classification data can be from a database in or associated with a retail store. The item description data 304 may include further information that describes the product. For example, other keywords describing products may be utilized that is not included in the classification data. In examples, this can come from various sources such as product catalog. The web-crawling information may include information obtained from web-sites.

At step 308, any of the data 302, 304, or 306 is cleaned. In aspects, this step obtains only the correct and required data for a commodity (e.g., size or ingredient data may be the only data required to classify a product while other data can be ignored). In these regards, information can be removed (e.g., brand name and item title). Spelling errors can be corrected. Abbreviations can be understood. Split words can be attached. Key words can be identified. Other cleaning steps are possible.

Video analytics can be used to recognize product images and use these to obtain product description data based upon matching product images. The images may include bar codes, ingredients, or country of origin to mention a few examples.

At step 310, machine learning pre-processing may occur. In this step machine learning may be used to synthesize codes. In these regards, a table of current Schedule B codes may be used to find possible codes to add to or modify a model. Additional examples of codes and relations of these codes to products are produced. For example, a base export code may be assigned to numerous types of woman's knit apparel (e.g., the same code may relate to woman's poncho knit, woman's poncho acrylic knit, and so forth). Synonyms of words can be used to add to the examples of the code (e.g., pants and trousers may be the same item so the same base code may be used to cover both pants and trousers).

To take another example, the model may not have seen, considered, or have included a certain item (e.g., an organic potato). But, there are might be 100 examples of non-organic potato products with the same or different codes. This step uses machine learning (using inputs, for example, from the web, store databases, and other on-line sources) to determine what a code should (reasonably or potentially) be for a product, e.g., an organic potato. Put another way, not all products have associated HTS codes and, in aspects, this step synthesizes code examples for these products (e.g., code 1234567890 is for an organic potato, and potentially for other potato products).

At step 312, the model is trained. In these regards, the model is modified according to the classification data 302, the item description data 304, web-crawling information 306, and any synthesized codes obtained at step 310. In aspects, the modifications may alter the model by adding, subtracting, or changing information in the model. When the model is a tree data structure, the structure (e.g., paths, branches, or leaves) of the tree may be modified. In examples, new codes may be added to the tree, the branching of the tree may be modified, or the probabilities contained at the leaves (and/or the codes at the leaves) may be changed. Other examples of changes can also be made.

When a layered model is used, images pulled from various sources (e.g., an online catalog) are used to retrain the last layers of the model in a process known as transfer learning to detect the edges and shapes in the images.

At step 314, a new item is to be classified and the model is tested against the description. In examples, an image can be taken of the item and/or other information can be entered concerning the item. One or more codes and their probabilities for being accurate are obtained by traversing the tree.

At step 316, it is determined if the probabilities are above a threshold. If the answer is affirmative, the classification of the product to a code is accepted at step 318. If the answer at step 316 is negative, a classification or potential code may be suggested. This suggestion may be made automatically or by a human.

Figure 4:
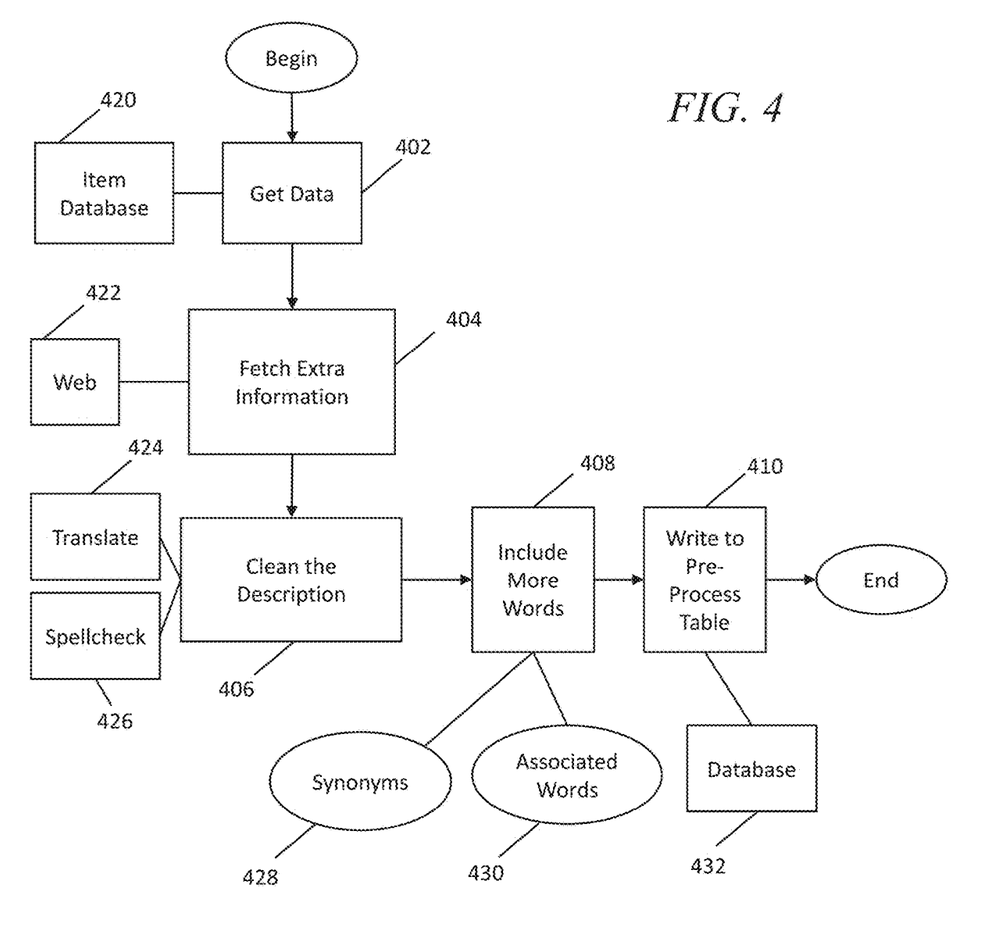
FIG. 4 comprises a flowchart as configured in accordance with various embodiments of these teachings.

Referring now to FIG. 4, one example of an approach for pre-processing data is described. At step 402, data is obtained from an item database 420. For example, the information may include product descriptions (and other types of information related to a product) from the database of a retail store. The descriptions, in examples, may include an item number (e.g., store item number), item description, department category description, and other keywords related to the product.

At step 404, extra information concerning the product is fetched from the web 422. This information can include information that is web-scraped from web sites or online catalogs to mention two examples.

At step 406, the descriptions (and possibly other information) obtained from steps 402 and 404 are cleaned. Translation (e.g., conversion from one language or format into another language of format) may occur at step 422 and a spell check may be used at step 426 to mention two examples.

At step 408, more words are included in the descriptions. For example, synonyms 428 and other words 430 may be found to supplement the information obtained in previous steps. In one example, if "pants" is included in the description the word "trousers" may also be included.

At step 410, all of the information may be written to a pre-process table that is stored in a database 432. This example continues with the execution of the approach described in FIG. 5.

Figure 5:
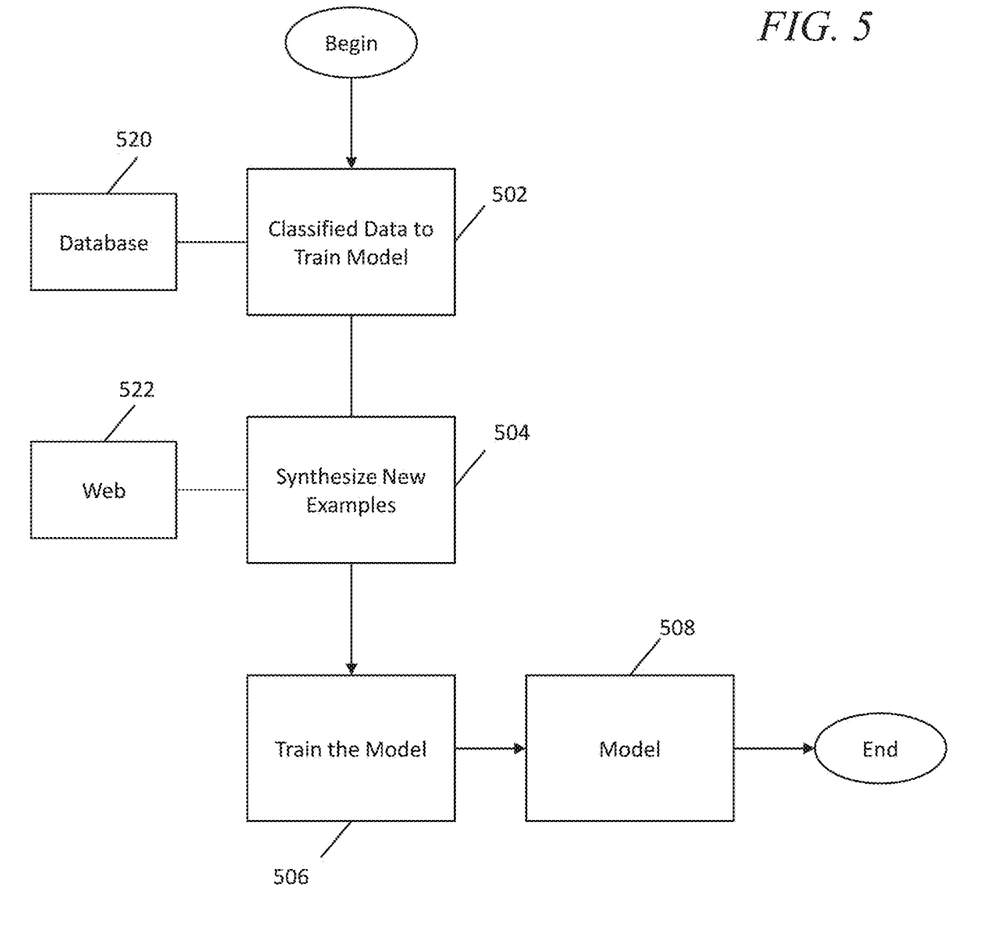
FIG. 5 comprises a flowchart as configured in accordance with various embodiments of these teachings.

Referring now to FIG. 5, one example of an approach for training a model is described. At step 502, a database 520 (e.g., the database 432) is accessed to obtain the classified data for training the model. The classified data may include the item descriptions of items and other information.

At step 504, new examples of export code-item relationships are synthesized. To take one example, the model may not have seen, considered, or included a certain item (e.g., export codes a particular type of woman's shirt). But, there are might be 100 examples of woman's shirt products. This step uses machine learning (using inputs, for example, from the web, store databases, and other on-line sources) to determine what a code could potentially be for the particular type of woman's shirt. In these regards, this step synthesizes new code examples (e.g., code 1234567890 is for this particular type of woman's shirt).

At step 506, the model is trained producing a modified model 508. For example, new leaves may be added to the model if the model is a tree. In other examples, the branching in the model may be altered. The classified data obtained from step 502 and the synthesized examples obtained from step 504 may be used to alter the model. In one example, the model may not include this particular product so a new leaf is added at the appropriate place in the model. Execution can then continue with the approach described with respect to FIG. 6.

Figure 6:
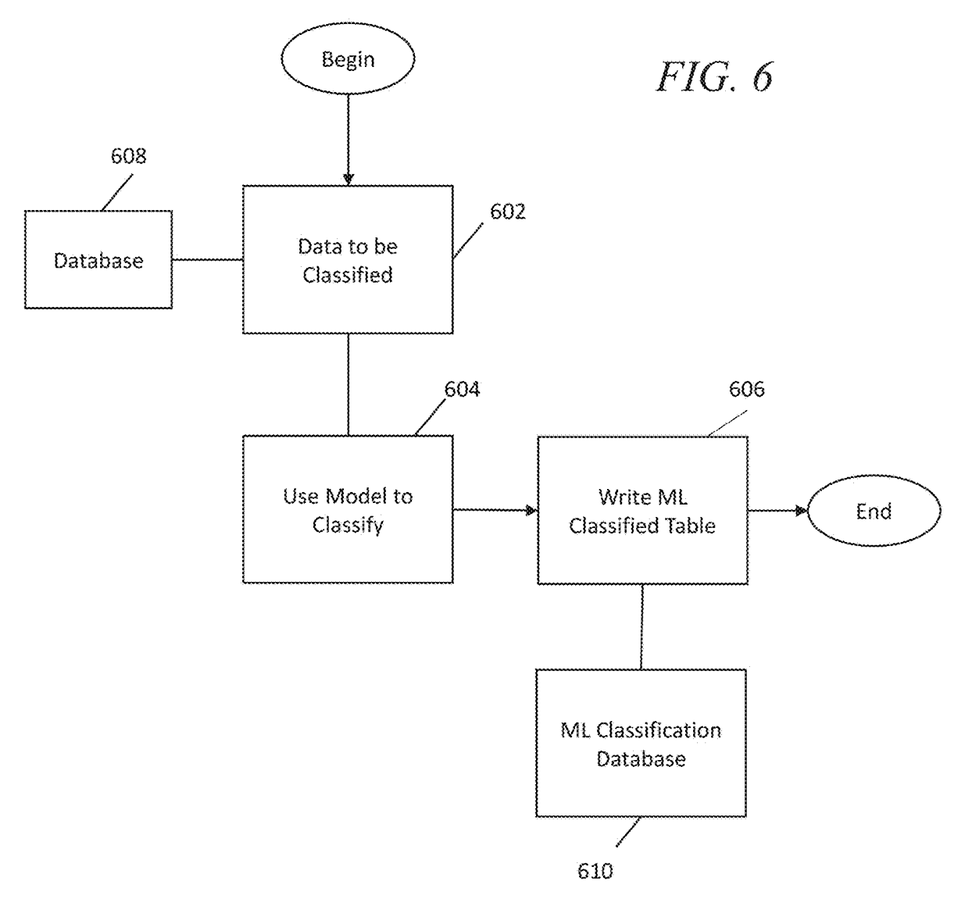
FIG. 6 comprises a flowchart as configured in accordance with various embodiments of these teachings.

Referring now to FIG. 6, one example of a classification approach is described. At step 602, new data (for a new product or item to be classified) is received from a database 608. Alternatively, the information may be entered manually. For example, a user at a portable electronic device may request a code. The request, for example, may include a photo of the item to be classified. An analysis of the At step 604, the model is used to classify the item. To take one example, the model is a tree the tree is traversed until one or more leaves are reached. For example, the item may be a particular type of woman's shirt (e.g., a woman's all cotton. V-neck, t-shirt) and the root of the tree may be for apparel. The tree is traversed until the leaf for this type of woman's shirt is reached. The leaf will include a potential code and a probability of the code being accurate for the type of woman's shirt.

At step 606, the potential code and probability information are written to a machine learning (ML) classification table in a ML classification database 610. Execution may then continue with the approach of FIG. 7.

Figure 7:
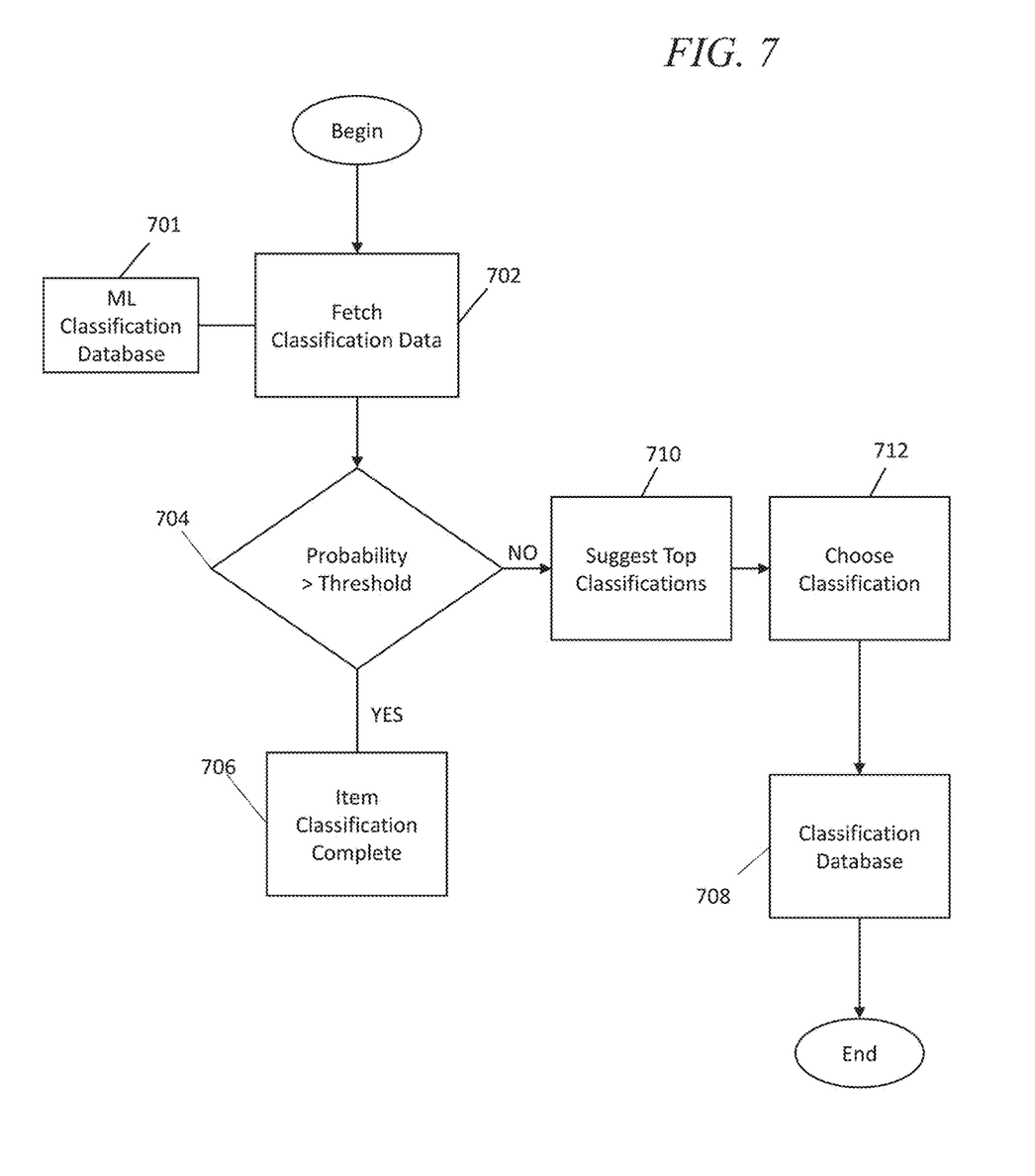
FIG. 7 comprises a flowchart as configured in accordance with various embodiments of these teachings.

Referring now to FIG. 7, one example of an approach for completing the classification of a product is described.

At step 702, classified data is fetched from the ML classification database 701 (e.g., also the ML classification database 610). The data includes one or more potential codes and the probabilities associated with the codes. The probabilities may be percentages obtained from customer feedback or other historical data that the codes chosen were correct for a particular product.

At step 704, it is determined if the probability for the code is greater than a threshold. If the answer is affirmative, the item classification (assignment of an export code) is complete at step 706. This is added to the classification database at step 708. The thresholds may be dynamic and changeable, and set by a system administrator.

If the answer at step 704 is negative, at step 710 a suggestion is made for the top classification for the product. In one example and when one more than one code is possible, then the code with the highest probability may be suggested automatically. In another example, a human may enter or make a suggestion as to which of multiple codes may be selected. At step 712, the classification may be chosen based upon the suggestion. The choice may be generated automatically or may be made by a human. Execution then continues with step 708 as has been described above.

Figure 8:
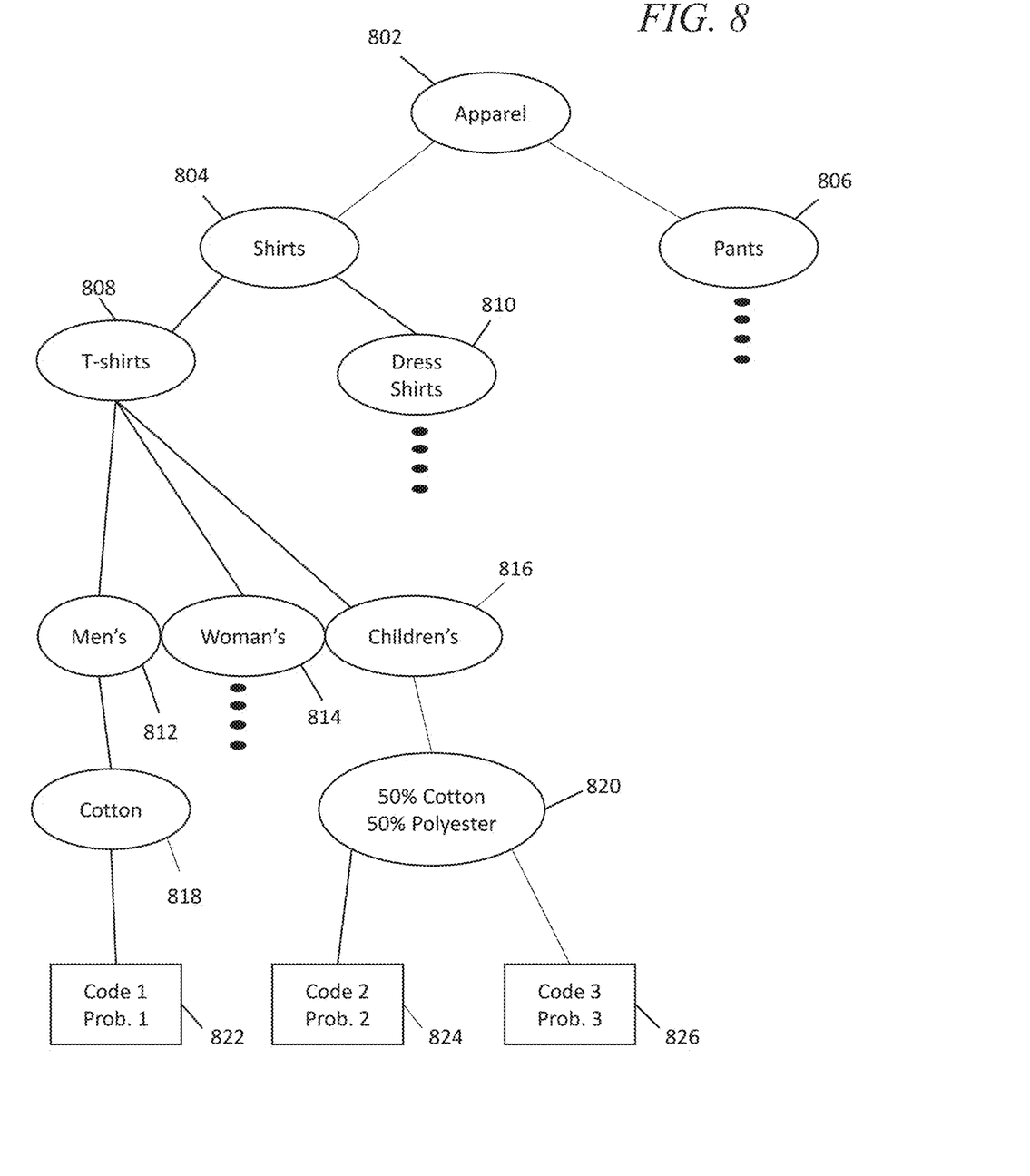
FIG. 8 comprises a diagram of a data structure as configured in accordance with various embodiments of these teachings.

Referring now to FIG. 8, one example of a model is described. It will be appreciated that the example of FIG. 8 is only one example of a model, in this case, a tree with a root node, various branches, and leaf nodes. Other examples of models include convolutional neural networks, which are known as a class of deep, feed-forward artificial neural networks utilized for analyzing visual imagery. It will be appreciated that the present approaches can be implemented with various types of model data structures or combinations of data structures.

In the example of FIG. 8, a root node 802 is for "apparel." The apparel root node 802 branches into a node 804 (for shirts) and a node 806 (for pants). The node 804 (shirts), in turn, branches into a node 808 (t-shirts) and a node 810 (dress shirts).

The node 808 (t-shirts), in turn, branches to a node 812 (men's t-shirts), a node 814 (woman's t-shirts) and a node 816 (children's shirts). The node 812 branches to node 818 (cotton). The node 818 branches to a leaf node 822 that has the code (CODE1) and probability (PROB1) for men's cotton t-shirts. Although not shown, the leaf nodes may include other information concerning the product.

The node 816 (children's t-shirts) branches to a node 820 (50% cotton and 50% polyester) that branches into two leaf nodes 824 (for cotton) and 826 (for polyester). Node 824 includes a CODE2 and PROB2, while Node 826 includes a CODE3 and PROB3.

It can be seen in this example, that potentially new leaf nodes can be added (e.g., node 812 may need a polyester-based leaf with associated code). Other examples of modifications can also be made to the tree of FIG. 8.

Also, it will be understood that, in aspects, when an item is to be classified (tested) then information from then information from the item (e.g., images, other information) may be obtained and used to traverse the tree. For example, image information for an apparel item may be obtained and the image analyzed (using well-known image analysis techniques) to obtain information concerning the item to be classified. For example, the analysis may include first information indicating the item is a shirt, second information that the item is a t-shirt, third information that the item is an item of men's clothing, and fourth information that the item is manufactured from cotton. Once the information is obtained, the model is accessed and a traversal of the tree made from node 802, to node 804, to node 808, to node 812, to node 818, and finally to node 822.

It will also be understood that the example of FIG. 8 does not show all potential branches or leaves of the tree. Additionally, it will be appreciated that the tree of FIG. 8 is for particular types of apparel and that trees for other types of apparel or other items not related to apparel are possible and the particular structure of these trees may vary according to various parameters.

In some embodiments, one or more of the exemplary embodiments include one or more localized IoT devices and controllers (e.g., utilized to obtain data concerning the products). As a result, in an exemplary embodiment, the localized IoT devices and controllers can perform most, if not all, of the computational load and associated monitoring and then later asynchronous uploading of data can be performed by a designated one of the IoT devices to a remote server. In this manner, the computational effort of the overall system may be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of data may include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernals of data in order to filter out data that may reflect generic background data. In an exemplary embodiment, KRG incrementally sequences all future undefined cached kernals having encoded asynchronous data in order to filter out data that may reflect generic background data. In a further exemplary embodiment, the kernel will filter out noisy data ("KRN"). In an exemplary embodiment, KRN, like KRI, includes substantially a continuously utilized near term source of data, but KRN may be retained in order to provide a predictive model of noisy data. In an exemplary embodiment, KRN and KRI, also incrementally sequences all future undefined cached kernels having encoded asynchronous data in order to filter out data that may reflect generic background data.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The invention claimed is:

1. A system for enabling the export of products from a jurisdiction, the system comprising:

an electronic database that stores an electronic model, the electronic model comprising a data structure defining a configuration of export codes for products and probabilities that one or more export codes are accurate, the data structure comprising a structure having a plurality of nodes and paths, the electronic database further storing product information, the product information comprising an attribute for the product;

wherein the electronic model has been trained in a training process to modify a structure of the electronic model based upon the product information from the electronic database and wherein one or more of the nodes and paths of the structure of electronic model are modified by the training process; and a control circuit, the control circuit being coupled to the database, the control circuit to:

download a web page from an external server and store the web page in the electronic database;

obtain export codes for selected products not presently represented in the electronic model using the information from the web page and export codes obtained from a regulatory source of a jurisdiction;

wherein the control circuit is coupled to the electronic database, the control circuit is to:

receive a request to ship a product-to-be-shipped from a jurisdiction via a shipping vehicle;

based upon an analysis of the information concerning the product-to-be-shipped, utilize the electronic model to obtain one or more potential export codes for the product-to-be-shipped and an associated probability;

select an export code from the one or more potential export codes; and transmit the selected export code to an electronic processing device of the regulatory source.

2. The system of claim 1, wherein the request includes additional product information obtained from a user at an electronic user device via a user interface.

3. The system of claim 1, wherein the electronic model is adjusted periodically at regular intervals.

4. The system of claim 1, wherein the jurisdiction is a country.

5. The system of claim 1, wherein the shipping vehicle is a truck, train, ship, automated ground vehicle, or aerial drone.

6. The system of claim 1, wherein the control circuit and database are disposed at a central processing center.

7. The system of claim 1, wherein the shipping vehicle exits the jurisdiction only after the selected export code is determined.

8. A method for enabling the export of products from a jurisdiction, the method comprising:

storing an electronic model in an electronic database, the electronic model comprising a data structure defining a configuration of export codes for products and probabilities that the export codes are accurate, the data structure comprising a structure having a plurality of nodes and paths, the electronic database further storing product information, the product information comprising, for each product, at least one of a product identifier and an attribute for the product;

at a control circuit, training the electronic model in a training process to modify a structure of the electronic model based upon the product information from the electronic database, one or more of the nodes and paths of the structure of electronic model being modified by the training process;

at the control circuit, downloading a web page from an external server and storing the web page in the electronic database;

at the control circuit, obtaining export codes for selected products not presently represented in the electronic model using information from the web page and export codes obtained from a regulatory source of a jurisdiction;

at the control circuit, receiving a request to ship a product-to-be-shipped from a jurisdiction via a shipping vehicle;

at the control circuit, based upon an analysis of the information concerning the product-to-be-shipped, utilizing the electronic model to obtain one or more potential export codes for the product-to-be-shipped and an associated probability;

at the control circuit, selecting an export code from the one or more potential export codes; and at the control circuit, transmitting the selected export code to an electronic processing device of the regulatory source.

9. The method of claim 8, wherein the electronic model is adjusted periodically at regular intervals.

10. The method of claim 8, wherein the product information is obtained by one or more electronic sensors and the sensors include cameras.

11. The method of claim 8, wherein the jurisdiction is a country.

12. The method of claim 8, wherein the shipping vehicle is a truck, train, ship, automated ground vehicle, or aerial drone.

13. The method of claim 8, wherein the control circuit and database are disposed at a central processing center.

14. The method of claim 8, wherein the shipping vehicle exits the jurisdiction only after the selected export code is determined.

15. A non-transitory machine readable medium storing computer instructions that, when executed, cause a processing resource to:

store an electronic model in an electronic database, the electronic model comprising a data structure defining a configuration of export codes for products and probabilities that the export codes are accurate, the data structure comprising a structure having a plurality of nodes and paths, the electronic database further storing product information, the product information comprising, for each product, at least one of a product identifier and an attribute for the product;

train the electronic model during a training process to modify a structure of the electronic model based upon the product information from the electronic database, one or more of the nodes and paths of the structure of electronic model being modified by the training process;

download a web page from an external server and storing the web page in the electronic database;

obtain export codes for selected products not presently represented in the electronic model using information from the web page and export codes obtained from a regulatory source of a jurisdiction;

receive a request to ship a product-to-be-shipped from a jurisdiction via a shipping vehicle;

based upon an analysis of the information concerning the product-to-be-shipped, utilize the electronic model to obtain one or more potential export codes for the product-to-be-shipped and an associated probability;

select an export code from the one or more potential export codes;

transmit the selected export code to an electronic processing device of the regulatory source.

16. The non-transitory machine readable medium of claim 15, wherein the electronic model is adjusted periodically at regular intervals.

17. The non-transitory machine readable medium of claim 15, wherein the product information is obtained by one or more electronic sensors and the sensors include cameras.

18. The non-transitory machine readable medium of claim 15, wherein the jurisdiction is a country.

19. The non-transitory machine readable medium of claim 15, wherein the shipping vehicle is a truck, train, ship, automated ground vehicle, or aerial drone.

20. The non-transitory machine readable medium of claim 15, wherein the shipping vehicle exits the jurisdiction only after the selected export code is determined.

* * * * *